United States Patent [19]
Collar et al.

[11] Patent Number: 6,020,796
[45] Date of Patent: Feb. 1, 2000

[54] SWITCHING MEANS FOR USE ON-BOARD A SPACECRAFT

[75] Inventors: Stephen Collar, Southampton; Nicola Jane Porecki, Southsea, both of United Kingdom

[73] Assignee: Matra Marconi Space UK Limited, Middlessex, United Kingdom

[21] Appl. No.: 08/881,332

[22] Filed: Jun. 24, 1997

[30] Foreign Application Priority Data

Jun. 28, 1996 [GB] United Kingdom ............... 9613628

[51] Int. Cl.$^7$ .................................................. H01P 1/10
[52] U.S. Cl. ........................................ 333/101; 333/105
[58] Field of Search ....................................... 333/101, 105

[56] References Cited

U.S. PATENT DOCUMENTS

| | | | |
|---|---|---|---|
| 3,600,682 | 8/1971 | Yoshimoto et al. | 333/101 X |
| 4,070,637 | 1/1978 | Assal et al. | 333/105 |
| 4,198,611 | 4/1980 | Eng | 333/105 |
| 4,502,026 | 2/1985 | Imazeki et al. | 333/101 |

FOREIGN PATENT DOCUMENTS

| | | |
|---|---|---|
| 0355985A2 | 7/1989 | European Pat. Off. . |
| 216474A | 12/1984 | United Kingdom . |

*Primary Examiner*—Benny Lee
*Attorney, Agent, or Firm*—Doanld C. Casey, Esq.

[57] ABSTRACT

Switching means of a satellite has a first set of switches for receiving respective channel slots of de-multiplexed narrow band channels. The set of switches may be made up of four position switches $5^1$, $5^2$ etc. Switch $5^2$ may be connected straight through, or to the straight through positions of switches $5^1$ and or $5^3$ via interswitch connections. The same is possible with the second set of switches 6. A wide selection of the possible frequency slots is possible (for example eight out of sixteen) to allow routing among the amplifiers 9, 10, some of which are designated as redundant.

3 Claims, 3 Drawing Sheets

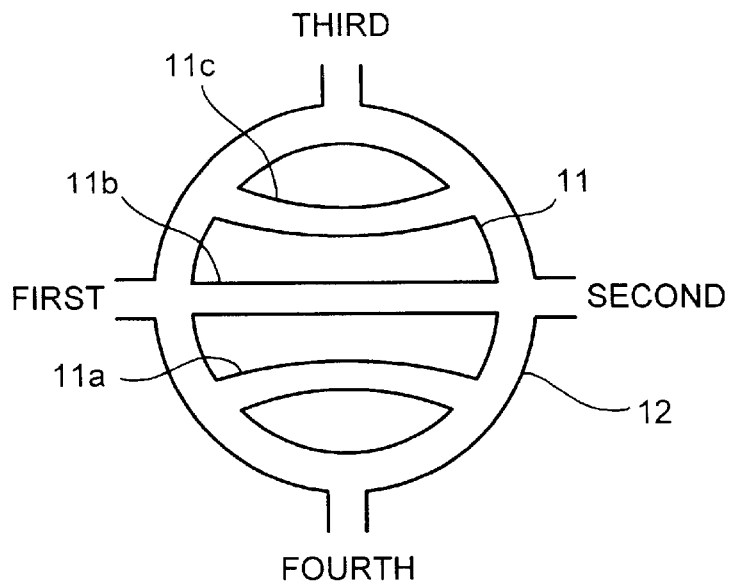
FIG. 4a
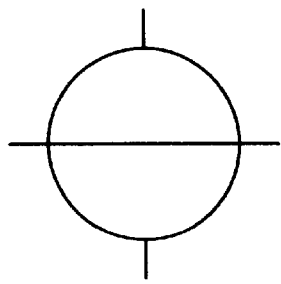 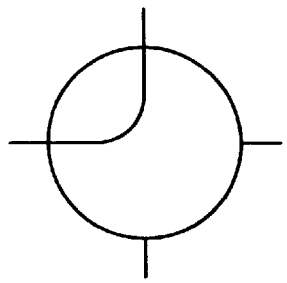
FIG. 4b   FIG. 4c
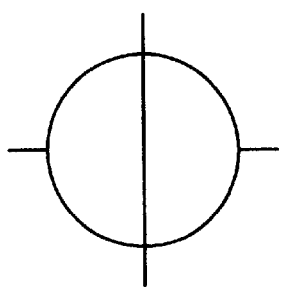 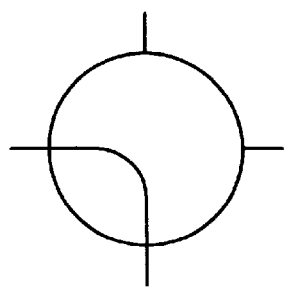
FIG. 4d   FIG. 4e

SWITCHING MEANS FOR USE ON-BOARD A SPACECRAFT

BACKGROUND

1. Field of the Invention

This invention relates to switching means for use on-board a spacecraft.

2. Description of the Prior Art

Typically, a spacecraft such as a communications satellite has at least one receiving antenna, signal switching and amplifying means, and at least one transmitting antenna.

In order to provide the necessary transmitted signal power, it is usual to de-multiplex (hereinafter F.D.M) the uplink frequency division multiplex (shown schematically in FIG. 1) and amplify the individual narrow band channels which could, for example, be television channels, rather than amplify the broad band F.D.M. signal.

Redundancy is provided for in satellites and, for this reason, a larger number of narrow band amplifiers is provided compared with the number of active signal channels, and the repeater must contain redundancy switches to enable a failed narrow band amplifier to be substituted by a previously unused (redundant) one.

In general, the uplink frequency division multiplex will contain a larger number of frequency slots than active channels. Thus, for example, the F.D.M. could consist of 32 frequency slots but only 16 slots could be active. The on-board signal processing apparatus must therefore be provided with selection switches to enable the desired channels to be selected out of the larger number of de-multiplexed slots.

However, the flexibility provided by known selection switches is restricted. Typically, the uplink F.D.M. signal slots will be conceptually arranged in pairs, such that either one of each pair may be selected on-board the satellite. The disadvantage of this is that, for reasons of convenience, it might be desired to select both signal slots of a pair at the same time.

The invention provides switching means for use on-board a spacecraft, comprising a set of switches for connection between a number of possible r.f. channel slots and a smaller number of active r.f. signal paths, wherein at least two of the switches each have a first port, for connection to a respective channel slot, which is selectively connectable to a second port, for connection to an r.f. signal path, or to an additional port connected to an additional port of the other switch, so that the channel slot associated with each switch is connectable to the r.f. signal path associated with the switch or, via the switch interconnection, to the r.f. signal path associated with the other switch.

This arrangement of switches provides flexibility in connecting different channel slots along different signal paths. Both signal paths could be active or either could be active resulting from a signal in either channel slot.

The two switches may each have two additional ports to which the first port is selectively connectable, each additional port of each switch being connected to an additional port of another switch. In this way, the channel slot associated with each switch can be fed along at least three r.f. signal paths.

Advantageously a further set of switches is provided for connection between the active r.f. signal paths and selected ones of a greater number of r.f. amplifiers. Preferably, at least two of the further set of switches each have at first port, for connection to a respective r.f. signal path, which is selectively connectable to a second port, for connection to a respective r.f. amplifier, or to an additional port connected to an additional port of the other switch, so that the r.f. signal path associated with each switch is connectable to the r.f. amplifier associated with that switch or, via the switch interconnection, to the r.f. amplifier associated with the other switch. The further set of switches may be used to switch in a redundant amplifier, for example, in order to replace a malfunctioning amplifier but, in conjunction with the first-mentioned set of switches, the further set may also be used to select a particular channel slot while equally the first-mentioned set may be used to replace a malfunctioning amplifier. When both sets of switches are used, different amplifiers may be made redundant over the life of the satellite. This is not possible with existing sets of redundancy switches.

Switching means for use in a repeater on-board a satellite will now be described, by way of example with reference to the accompanying drawings, in which:

BRIEF DESCRIPTION OF THE DRAWINGS

FIG. 4a illustrates one of the switches of the switching means of FIG. 3 in more detail;

FIG. 4b shows schematically the connection of the first and second ports of the switch of FIG. 4a.

FIG. 4c shows schematically the connection of the first and third ports of the switch of FIG. 4a.

FIG. 4d shows schematically the connection of the third and first ports of the switch of FIG. 4a.

FIG. 4e shows schematically the connection of the first and fourth ports of the switch of FIG. 4a.

DETAILED DESCRIPTION OF THE INVENTION

Figure 1:
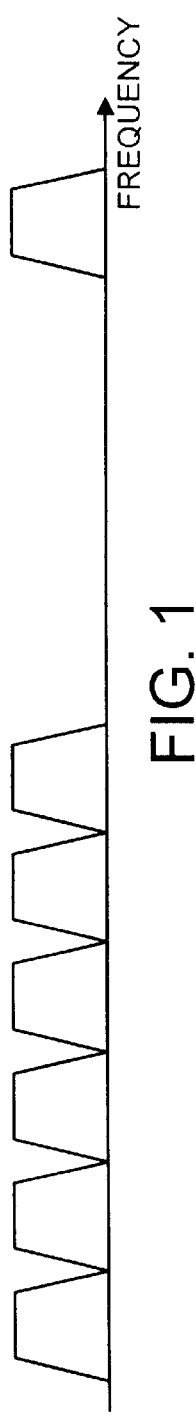
FIG. 1 is a schematic illustration of a typical F.D.M. uplink or downlink from the satellite.

Referring to FIG. 1, a typical F.D.M. is shown. The actual frequency values of the slots would differ for the uplink and for the downlink. The satellite has a receiving antenna and a transponder in which the wideband F.D.M. signal is amplified and filtered, de-multiplexed into respective channel slots, amplified in the narrow band slots, and filtered in those slots and multiplexed for passage to the transmitting antenna. The switching means of the invention is concerned with the switching of the de-multiplexed narrow band channels before they are individually amplified, and after they have been amplified but before they are multiplexed for transmission.

Figure 2:
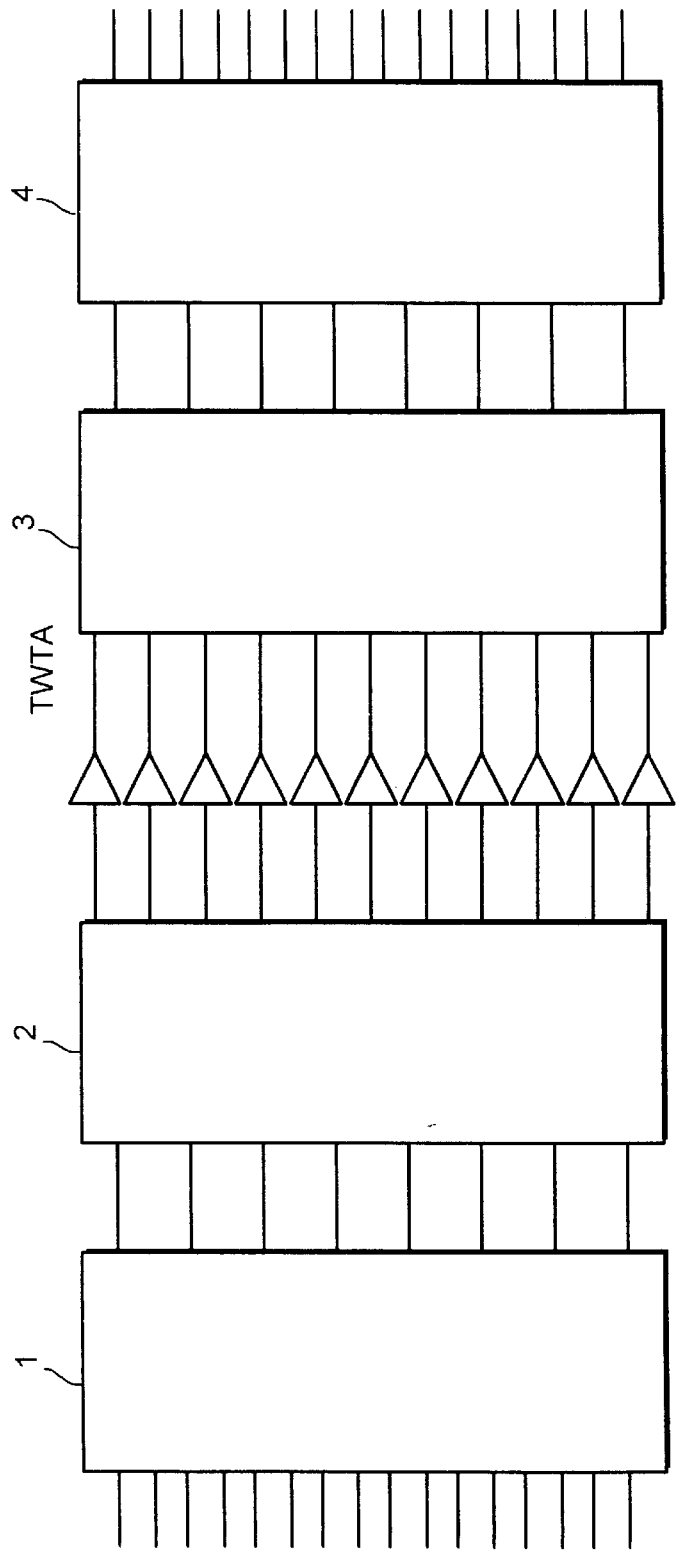
FIG. 2 is a schematic illustration of known switching means for use on-board a satellite.

FIG. 2 shows a known switching means for accomplishing this. The switching means includes a first set of switches 1. As an example, the first set of switches might have 16 inputs on the left hand side and 8 outputs on the right hand side. The inputs are the de-multiplexed channel slots and the outputs are the active r.f. signal paths out of those possible frequency slots. These switches are known as channel selection switches. The outputs are connected to the input of a second set of switches 2 which connect the, for example, 8 inputs to a larger number, for example, 11 individual amplifying channels. These switches are known as redundancy selection switches. Each individual channel may contain a travelling wave tube amplifier (TWTA). A number, for example three, of these channels are designated as redundant, in order to provide a backup in case any of the amplifiers designed to be operational fails during the lifetime of the satellite. After amplification the amplified signals pass through a set of switches 3 corresponding to the second set so that the active r.f. channels appear at the output of the set of switches 3 whatever amplifiers have been selected to be redundant, and these active r.f. channels are returned to their appropriate signal slots in another set of switches 4 corresponding to the first set. The active outputs from the fourth set of switches are fed to filters and multiplexers for downward transmission.

In the known switching means, the inputs to the first set of switches 1 are conceptually arranged in pairs so that each output can be connected to one of two particular inputs. The procedure is reversed at the set of switches 4. Clearly, this restricts the choice of channel slots which can be used by the satellite. The second set of switches 2 and their counterpart 3, for redundancy purposes, is more flexible and may consist of a ring of four port switches (FIGS. 4a–4e). Each switch can connect a first port (a channel slot) to a second port (an r.f. signal path) (straight through—FIG. 4b) or to a third or fourth port (FIGS. 4c, 4e) connecting to respective positions of the neighbouring switches. The output can then be taken from the second port of the neighbouring switches to connect to those r.f. signal paths. The position of the non-operating or redundant amplifiers is selected before the satellite is launched (usually as a design feature), and the redundancy ring and spare amplifiers will only be used in the event of a failure. The switch (FIG. 4a) has an outer cylindrical body 12, and an inner rotor 11 containing waveguide sections 11a, 11b and 11c. The rotor is rotated appropriately to produce the arrangements of FIGS. 4b to 4e.

For example, the second set of switches could consist of eleven four port switches. The second port is connected to a respective TWTA. The third port of each switch is connected to the fourth port of the switch connected to the next above TWTA as seen in FIG. 2, apart from the third port of the switch connected to the top TWTA as seen in FIG. 2, which is connected by a link to the fourth port of the switch connected to the bottom TWTA as seen in FIG. 2.

The first ports of the eight switches connected to the TWTAs which have not been designated as redundant, are connected to the outputs of the switches 1.

Now if a TWTA fails when the satellite is in orbit, say, if the top TWTA (as seen in FIG. 2) fails yet is connected to the output of the switch in the set 1 through which passes the top active c.f. signal path (as seen in FIG. 2). Also, assume that the second TWTA from the top is designated as redundant i.e., the switch in the set 2 it is connected to at the second port is not connected to an active r.f. signal path at the first port. Instructions are now given from the ground to cause the rotors of the top two switches of the set 2 to cause the first port of the top switch to connect to the fourth port of the top switch, and to cause the third port of the switch below to connect to the second port, thereby feeding the active signal path through the second TWTA, which is operative. Similar changes are made in the set of switches 3.

Figure 3:
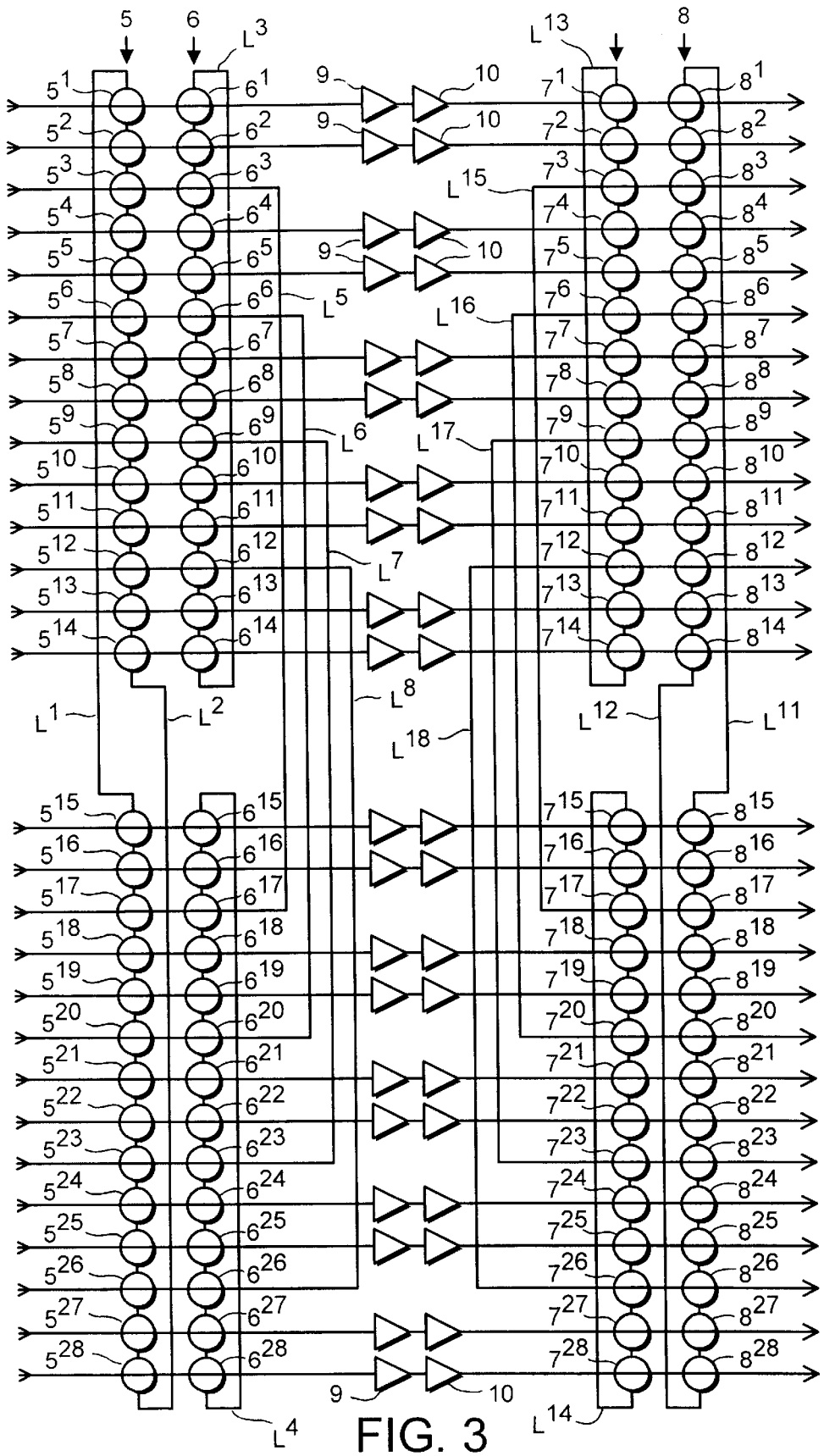
FIG. 3 is a schematic diagram of switching means for use on-board a satellite in accordance with the invention.

Referring to FIG. 3, which shows the switching means according to the invention, a much more flexible choice of de-multiplexed channel slots is possible.

There are twenty-eight switches in a first row of switches 5 (the left-hand vertical now as seen in FIG. 3), and each is a four port switch as illustrated in FIGS. 4a–4e. The switches of the row 5 are designated as follows—$5^1, 5^2, 5^3, 5^4, 5^5, 5^6, 5^7, 5^8, 5^9, 5^{10}, 5^{11}, 5^{12}, 5^{13}, 5^{14}, 5^{15}, 5^{16}, 5^{17}, 5^{18}, 5^{19}, 5^{20}, 5^{21}, 5^{22}, 5^{23}, 5^{24}, 5^{25}, 5^{26}, 5^{27}, 5^{28}$. The row is shown in two sections.

The first port of each switch in the row 5 connects to a respective de-multiplexed channel slot, of which fourteen are active.

The third and fourth ports of the switches are interconnected and two links $L^1, L^2$ complete the ring.

The second ports of the switches of the row 5 are connected to first ports of four port switches of a row 6. The switches of the row 6 are designated as follows—$6^1, 6^2, 6^3, 6^4, 6^5, 6^6, 6^7, 6^8, 6^9, 6^{10}, 6^{11}, 6^{12}, 6^{13}, 6^{14}, 6^{15}, 6^{16}, 6^{17}, 6^{18}, 6^{19}, 6^{20}, 6^{21}, 6^{22}, 6^{23}, 6^{24}, 6^{25}, 6^{26}, 6^{27}, 6^{28}$. The row 6 is next to the row 5. The switches of the row 6 are also as illustrated in FIGS. 4a–4e. The third and fourth ports of the switches of the row 6 are also interconnected. In this case, the switches are contained in two rings, not one as for the switches 5, links $L^3$ and $L^4$ completing the ring.

Twenty amplifiers each consisting of a driver limiter amplifier 9 and a travelling wave tube amplifier 10 are distributed between the twenty-eight switches, being connected to the second ports. Of those twenty amplifiers, six are designated as being redundant. The second ports of the other eight switches of the set 6 are connected to each other by means of links $L^5, L^6, L^7$ and $L^8$ (These links have counterparts $L^{15}, L^{16}, L^{17}$, and $L^{18}$ on the output side, and links $L^1, L^2, L^3$, and $L^4$ have counterparts $L^{11}, L^{12}, L^{13}, L^{14}$ on the output side).

The set of four ports switches 7 corresponds to the set 6, and connects the live r.f. amplifiers 9, 10 to the set of four port switches 8, corresponding to the set 5, whereupon the now amplified r.f. signals are returned to the appropriate of the twenty-eight channel slots by the switches 8. The active outputs are fed to filters and multiplexers for downward transmission the switches of this set 7 are designated $7^1, 7^2, 7^3, 7^4, 7^5, 7^6, 7^7, 7^8, 7^9, 7^{10}, 7^{11}, 7^{12}, 7^{13}, 7^{14}, 7^{15}, 5^{16}, 5^{17}, 5^{18}, 5^{19}, 5^{20}, 7^{21}, 7^{22}, 7^{23}, 7^{24}, 7^{25}, 5^{26}, 5^{27}, 5^{28}$ and the switches of set 8 are designated $8^1, 8^2, 8^3, 8^4, 8^5, 8^6, 8^7, 8^8, 8^9, 8^{10}, 8^{11}, 8^{12}, 8^{13}, 8^{14}, 8^{15}, 8^{16}, 8^{17}, 8^{18}, 8^{19}, 8^{20}, 8^{21}, 8^{22}, 8^{23}, 8^{24}, 8^{25}, 8^{26}, 8^{27}, 8^{28}$.

Compared to the known arrangement of FIG. 2, a much wider choice of de-multiplexed channel slot is possible with the arrangement of the invention shown in FIG. 3. In FIG. 2, it was only possible to select one of each of the paired input channel slots. With the arrangement of FIG. 3, any fourteen out of the twenty-eight channel slots can be selected.

The key to the invention is the use of four port switches for the rows 5 and 8 as well as for the rows 6 and 7.

The flexibility of the present arrangement will become apparent by consideration of the channel slot input to switch $5^7$. If the amplifiers 9, 10 in this case line cease operation, the signal can be redirected to frequency slot 8 using the switch interconnection of the third and fourth ports either for the switches $5^7, 5^8$ or $6^7, 6^8$.

The signal can be redirected to frequency slot 5 using the third/fourth port interconnection of switches $5^5, 5^6, 5^7$ or $6^5, 6^6, 6^7$ or a combination of these. This would be feasible when slot 6 was not being used.

Switches 7 and 8 are set corresponding to the settings of switches 6 and 5 respectively.

It would even be possible to use entirely the top fourteen or the bottom fourteen frequency slots. The third slot down would be able to access amplifiers 9 and 10 via the interconnection of switches $6^{17}$ and $6^{16}$ or $16^{17}$ and $16^{18}$, or $5^{17}$ and $5^{16}$ or $5^{17}$ and $5^{18}$ (using link $L^5$).

The arrangement of channel slots so that pairs with amplifiers are interspersed with links to other outputs is particularly advantageous for maximum flexibility.

A particular advantage of the switching means of the invention is for co-located satellites which might each cover a section of a broadband spectral region, so that if a channel failed on any of those satellites, the satellite of the invention would be able to be switched in to replace whatever the failed frequency was almost instantaneously.

Of course variations are possible without departing from the scope of the invention. Thus, while twenty-eight switches are shown, the invention is applicable to more or less then this number. Equally while twenty amplifiers are shown, six being redundant, different numbers of redundant amplifiers may be provided, and different numbers of amplifiers designated as working may be provided, depending on the number of channels being used. The switches 5 (and 8) may be arranged in two rings, like the switches 6, 7, or the latter may be arranged in a single ring. Alternatively, the links $L^1$, $L^2$ may be omitted altogether, as could be the links $L^5$, $L^6$, $L^7$, $L^8$, and similarly on the output side. While it is preferred that all the switches are four port switches, some of the switches may be two port switches (either allowing straight through communication or preventing straight through communication), or some may be three port (adjacent pairs of switches 5 or 6 may be interconnected but not connected to the switches on either side of the pair, with the corresponding changes on the output side.)

The bodies of the switches forming the stator may be one unitary piece of material. As shown in FIG. 3, there would be two such blocks on the input to the amplifiers, and a further two on the output. If desired, a single block could be used for the switches 5, 6 on the input and another single block for the switches 7, 8 on the output. The port interconnections may be formed in the block, but separate waveguide sections may be used instead.

It would be usual to use isolators between the amplifiers 9, 10 and the respective switches 7.

While the switches have all been shown as being as in FIG. 4a i.e. waveguide switches, some or all of them could be co-axial switches, especially on the input side. In such a case, contact would be made in a similar way with a rotor and stator arrangement but with no waveguide sections.

The twenty-eight demultiplexer narrow band channels on the space craft may be fed by co-axial cable. Each co-axial line may be connected to a co-axial to waveguide transition (in the case when the input switches are waveguide switches).

The frequency slots may be in the Ku band (10–18 GHz), but the invention could also be used for other frequencies.

The frequency of the signal may be the same in the input and output switches, down-conversion for the downlink taking place after the output switches, but this could be done in the amplification chain if desired.

What is claimed is:

1. Switching means for use on-board a spacecraft, comprising a first set of switches for connection between a number of r.f. channel slots and a smaller number of active r.f./signal paths, at least two of the switches in said first set each have a first port, for connection to a respective channel slot, which is selectively connectable to a second port, for connection to a corresponding r.f. signal path, or to a first additional port thereof which is connected in a switch interconnection to a first additional port of the other one of the at least two switches, so that the respective channel slot associated with each switch is connectable to the corresponding r.f. signal path associated with that switch or, via the switch interconnection, to the r.f. signal path associated with the other of the at least two switches; and a second set of switches provided for connection between the active r.f. signal paths and selected ones of a greater number of r.f. amplifiers than said r.f. paths, at least two switches of the second set of switches each have a first port, one of said first ports in said second set of switches is connected to a respective active r.f. signal path, said first port is selectively connectable to a second port in said second set of switches, at least one of said second ports in said second set of switches is connected to a respective r.f. amplifier, or said first port in said second set of switches is selectively connectable in a switch interconnection to a first additional port thereof which is connected to a first additional port of the other switch of the at least two switches of the second set, so that the respective active r.f. signal path is connectable to the corresponding r.f. amplifier either directly through one of the at least two switches of the second set or, via the switch interconnection, through the other one of the at least two switches of the second set, the second port of the at least two switches of the first set are connected to corresponding first ports of the at least two switches of said second set.

2. Switching means as claimed in claim 1, in which the two switches of said first set each have a second additional port to which the first port thereof is selectively connectable, each additional port of each switch being connected to an additional port of another switch.

3. Switching means as claimed in claim 1, in which the at least two switches of said second set each have a second additional port to which the first port thereof is selectively connectable, each additional port of each switch being connected to an additional port of another switch.

* * * * *